(12) United States Patent
Adar et al.

(10) Patent No.: US 7,136,876 B1
(45) Date of Patent: Nov. 14, 2006

(54) METHOD AND SYSTEM FOR BUILDING AN ABBREVIATION DICTIONARY

(75) Inventors: Eytan Adar, Menlo Park, CA (US); Lada A. Adamic, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 10/379,003

(22) Filed: Mar. 3, 2003

(51) Int. Cl.
*G06F 17/30* (2006.01)

(52) U.S. Cl. ...................... 707/104.1; 707/6; 715/532; 704/209; 704/265

(58) Field of Classification Search .................... None
See application file for complete search history.

(56) References Cited

U.S. PATENT DOCUMENTS 4,459,049 A * 7/1984 Howell et al. ................. 400/98
6,922,809 B1 * 7/2005 Coden et al. ................ 715/531
6,965,864 B1 * 11/2005 Thrift et al. ................ 704/275

OTHER PUBLICATIONS

Bowden, P.R., et al., "Dictionaryless English Plural Noun Singularisation Using a Corpus-Based List of Irregular Forms," *17th International Conference on English Language Research on Computerized Corpora*, Stockholm, May 15-19, 1996.
Krauthammer, M., et. al, "Using BLAST for Identifying Gene and Protein Names in Journal Articles," *Gene*, 259:245-252, 2000.
Bowden, P.R., et al., "Dictionaryless English Plural Noun Singularisation Using a Corpus-Based List of Irregular Forms," *17th International Conference on English Language Research on Computerized Corpora*, Stockholm, May 15-19, 1996. (no copy available).
2000, Krauthammer, M., et. al, "Using BLAST for Identifying Gene and Protein Names in Journal Articles," *Gene*, 259:245-252. (no copy available).
Adamic, L.A., et al., "A Literature Based Method for Identifying Gene-Disease Connections," *IEEE Computer Society Bioinformatics Conference*, Stanford, CA, Aug. 14-16, 2002.
Blascheke, C., et al., "Automatic extraction of biological information from scientific text: protein—protein interactions," *7th International Conference on Intelligent Systems for Molecular Biology*, Heidelberg, Germany, Aug. 6-10, 1999.
Chang, J.T., et . al, "Including Biological Literature Improves Homology Search," *Proceedings of the Pacific Symposium on Biocomputing* 2001, 5:274-283.
Chang, J.T., et. al, "Creating an Online Dictionary of Abbreviations from MEDLINE," *Journal of the American Medical Informatics Association*, Jul. 23, 2002.
Jenssen, T.K., et. al, "A Literature Network of Human Genes for High-Throughput Analysis of Gene Expression," *Nature Genetics*, 28:21-28, May 2001.

(Continued)

Primary Examiner—Jean M. Corrielus

(57) ABSTRACT

A method and apparatus for building an abbreviation dictionary involves searching through a set of source documents. The abbreviations having likely definitions are identified and the definitions extracted from the document. The definitions having identical associated abbreviations are grouped together. The definition groups are each arranged into clusters based on an n-gram or other combinatorial method to determine similar definition. Further disambiguation is provided by looking at similarity between clusters using an annotation associated with the source documents from which the definitions were extracted.

28 Claims, 10 Drawing Sheets

OTHER PUBLICATIONS

Larkey, L.S., et. al, "Acrophile: An Automated Acronym Extractor and Server," *5th ACM Conference on Digital Libraries*, San Antonio, TX, Jun. 2-7, 2000.

Liu, H., et. al, "Disambiguating Ambiguous Biomedical Terms in Biomedical Narrative Text: An Unsupervised Method," *Journal of Biomedical Informatics*, 34:249-261 (2001).

Liu, H., et. al, "A Study of Abbreviations in MEDLINE Abstracts," *American Medical Informatics Association Symposium*, San Antonio, TX, Nov. 9-13, 2002.

Park, Y., et. al, "Hybrid Text Mining for Finding Abbreviations and Their Definition," *Empirical Methods in Natural Language Processing*, Pittsburg, PA, Jun. 3-4, 2001.

Porter, M.F., "An Algorithm for Suffix Stripping," *Program*, 14(3):130-137 (Jul. 1980).

Pustejovsky, J., et. al, "Extraction and Disambiguation of Acronym-Meaning Pairs in MEDLINE," *10th World Congress on Health and Medical Informatics*, London, Sep. 2-5, 2001.

Taghva, K., et. al, "Recognizing Acronyms and Their Definitions," Information Science Research Institute, University of Nevada, TR 95-03, Jun. 1995.

Yandell, M., et. al, "Genomics and Natural Language Processing," *Nature Reviews Genetics*, 3:601-609, Aug. 2002.

Yeates, S., "Automatic Extraction of Acronyms from Text," *New Zealand Computer Science Research Students' Conference*, pp. 117-124, 1999.

Yeates, S., et. al., "Using Compression to Identify Acronyms in Text," *Data Compression Conference*, Snowbird, UT, Mar. 28-30, 2000.

Yoshida, M., et. al, "PNAD-CSS: A Workbench for Constructing a Protein Name Abbreviation Dictionary," *Bioinformatics*, 16(2):169-175, 2000.

Yu, H. et. al, "Mapping Abbreviations to Full Forms in Biomedical Articles," *Journal of the American Medical Informatics Association*, 9:262-272, 2002.

* cited by examiner

```
BUILD-PATHS(A,W)
1   for i = 0 to length[W]
2      c = W[i]
3      I[c][length[I[c]]] = i
4   for j = 0 to length[A]
5      c = A[j]
6      if length[P] = 0
7         for i = 0 to length[I[c]]
8            P[length[P],0] = I[c,i]
9         if length[P] = 0
10           return null
11      else
12         N = null
13         for i = 0 to length[P]
14            P_j = P[i]
15            if length[I[c]] = 0
16               return null
17            for k = 0 to length[I[c]]
18               I_j = P_j [length[P_j] - 1]
19               if I[c,k] > I_j
20                  P_new = copy[P_j]
21                  P_new [length[P_new]] = [c,k]
22                  N[length[N]] = P_new
23         P = N
24  return P
```

Copyright © 2003 Hewlett Packard Company

*FIG. 4*

| | Score |
|---|---|
| determine the geographical distribution of ribonucleic acid | |
| deter̲mi̲ne the geogra̲phical distribution of ribonucleic acid | -4 |
| deter̲mi̲ne the geographica̲l distribution of ribonucleic acid | -4 |
| deter̲mi̲ne the geographical distribution of ribonucleic a̲cid | -2 |
| deter̲mine the geographical distributio̲n of ribonucleic a̲cid | -2 |
| deter̲mine the geographical distribution of ribo̲nucleic a̲cid | -2 |
| determine the geo̲graphical distributio̲n of ribonucleic a̲cid | 0 |
| determine the geo̲graphical distribution of ribo̲nucleic a̲cid | 0 |
| determine the geographical dist̲ribution of ribonucleic a̲cid | 1 |
| determine the geographical dist̲ribution of ribo̲nucleic a̲cid | 1 |
| determine the geographical distribution of r̲ibo̲nucleic a̲cid | 3* |

| | First few letters of the abbreviation: ☐ | Submit Query |
|---|---|---|
| | Search by definition here 1004 1006 | |

| Abbrev | Most common def. |
|---|---|
| Aa | actinobacillus actinomycetemcomitans (more) |
| AA | arachidonic acid (more) |
| AA- | aminoacids (more) |
| AA1 | amnion antigens 1 (more) |
| AA-2G | ascorbic acid 2 o alpha glucoside (more) |
| AA-2P | ascorbic acid 2 phosphate (more) |
| AA4H | acetanilide 4 hydroxylase (more) |
| AA-673 | amlexanox (more) |
| AAA | abdominal aortic aneurysm (more) |

1000 → (figure reference)
1002 → (figure reference)

| AA | |
|---|---|
| (click any definition to "expand") | |
| arachidonic acid | 2770 documents |

Related definitions:

| arachidonic | arachidonic acid | arachidonate acid |
|---|---|---|

Possible filters:

Arachidonic Acid, Arachidonic Acids, Phospholipases A, Cells, Cultured, Dinoprostone, Blood Platelets, Platelet Aggregation, Prostaglandins, Calcium, Indomethacin, Thromboxane B2, Prostaglandin-Endoperoxide Synthase, Phospholipids, Calcimycin, Fatty Acids, Unsaturated, Enzyme Activation, Fatty Acids, Hydroxyeicosatetraenoic Acids, Epoprostenol, Dose-Response Relationship, Drug See also: Aa ArA 3H-AA ARA

| | arachidonate | 63 documents |
|---|---|---|
| ascorbic acid | | 498 documents |
| | ascorbate | 21 documents |
| amino acid | | 305 documents |
| aplastic anemia | | 257 documents |
| adjuvant arthritis | | 154 documents |
| | arthritic rats | 2 documents |

1200

| Query: DCC mice |
|---|
| (up to 100 results returned) |

| Definition found in text | Similar definition found | MeSH clustered |

| dextran coated charcoal | 1 documents |
|---|---|
| * [Production and application of mouse antiserum to human estrogen receptors] (8697973)<br>Definition found: dextran coated charcoal | |

| dicyclohexylcarbodiimide | 6 documents |
|---|---|
| * Synthesis of some 2-arylpropionic acid amides as prodrugs. (8876939)<br>Definition found: dicyclohexylcarbodiimide | |
| * Generation of polyclonal catalytic antibodies against cocaine using transition state analogs of cocaine conjugated to diptheria toxoid. (8575031)<br>Definition found: dicyclohexyl carbodiimde | |
| * Radioisotope carrying polyethylene oxide-polycaprolactone copolymer micelles for targetable bone imaging. (11771706)<br>Definition found: diaminohexyl cyclocarbodiimide | |
| * MHC restriction in contact hypersensitivity7 to dicyclohexylcarbodiimide. (12176098)<br>Definition found: dicyclohexylcarbodiimide | |
| * Contact hypersensitivity to dicyclohexylcarbodiimide and diisopropylcarbodiimide in female B6C3F1 mice. (9598300)<br>Definition found: dicyclohexylcarbodiimide | |

METHOD AND SYSTEM FOR BUILDING AN ABBREVIATION DICTIONARY

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates in general to automated text tools for building abbreviation dictionaries.

BACKGROUND

Dictionaries are, of course, very useful references. Users often rely on a dictionary when looking up the meanings of unknown words. Dictionaries are constantly being updated having new words added and obsolete words removed. This updating takes time and manpower. This is not a problem for written language dictionaries, since a written language such as English does not change so rapidly that dictionary writers cannot keep up. A relatively recent and accurate English dictionary is not hard to find.

The situation is different in technical fields such as medicine or computer technologies. These technical fields are rapidly changing, and as a result relatively obscure jargon is the norm for specialists in these fields. Even an expert in a given field can become quickly overcome by the jargon, especially when exploring only slightly different fields of expertise. For example, a networking protocol engineer may have to undergo significant background research to understand the latest concepts in microprocessor design.

The use of jargon can become especially troublesome when the common practice of acronyms and abbreviations are factored in. The meanings of abbreviations (which are a superset of acronyms) are not usually apparent on their face. Further, two or three letter abbreviations are common, leading to a duplication of many abbreviations, even within the same specialty.

Although typical dictionaries may include some abbreviation forms, such abbreviations are only included when widely adopted in the language. To cover abbreviations used in a particular field of expertise would require a specialized dictionary. However, specialized dictionaries are not always available. Even so, in rapidly changing technological fields, the acronyms and abbreviations may be created faster than they can be added to such a dictionary.

An apparatus and method that address the aforementioned problems, as well as other related problems, are therefore desirable.

SUMMARY

To overcome limitations in the prior art described above, and to overcome other limitations that will become apparent upon reading and understanding the present specification, methods and apparatus are disclosed for building an abbreviation dictionary. In general, the invention can be computer-implemented to search through digitally formatted documents.

In accordance with one embodiment of the invention, a computer-implemented method for building an abbreviation dictionary involves extracting a plurality of entries from a plurality of source documents. Each entry may include an abbreviation and a definition. The entries are grouped into definition sets. The entries in each definition set have identical abbreviations.

A plurality of definition clusters may be formed within each definition set by calculating similarity values between the definitions of the entries. Entries having a shared similarity value greater than a threshold value are aggregated into the definition clusters. The definition clusters formed in this way can be presented as a set of alternate definitions for the entries.

Similarities used for clustering definitions may be found by examining n-gram relationships between definitions. Other similarity analyses may be used to disambiguate definition clusters, such as looking at annotations related to the plurality of documents.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

FIG. 4 is a pseudo-code listing of an example algorithm used for extracting definition paths in accordance with embodiments of the present invention;

FIG. 5 is an example of definition scoring results for the potential definitions of the abbreviation "RNA" identified in FIG. 2;

FIG. 10 is an example user interface displaying the results of a search for abbreviations in accordance with embodiments of the present invention;

FIG. 11 is an example user interface for displaying details for the abbreviation found in FIG. 10 in accordance with embodiments of the present invention; and FIG. 12 is an example user interface for showing a clustered database search result clustered by different definitions in accordance with embodiments of the present invention.

DETAILED DESCRIPTION

In the following description of various embodiments, reference is made to the accompanying drawings which form a part hereof, and in which is shown by way of illustration various example manners in which the invention may be practiced. It is to be understood that other embodiments may be utilized, as structural and operational changes may be made without departing from the scope of the present invention.

The various embodiments of the present invention provide methods and apparatus for automatically building an abbreviation dictionary by searching through text. Texts such as journals, published papers, reports, etc., often make liberal use of abbreviations and acronyms. It will be appreciated that acronyms are a subset of abbreviations, so the use of the term abbreviation herein is intended to cover all manner of shortening words or phrases, including acronyms.

Text may be automatically searched for abbreviations and determining the definition of the abbreviation. Multiple definitions for the same abbreviation are clustered together using similarities in character patterns between definitions. This will identify definitions that are merely variations on a base definition, such as plurals, verb-tense, different suffix forms, etc. Finally, a disambiguation to resolve between the definition clusters is applied using annotations to link related terms.

Figure 1:
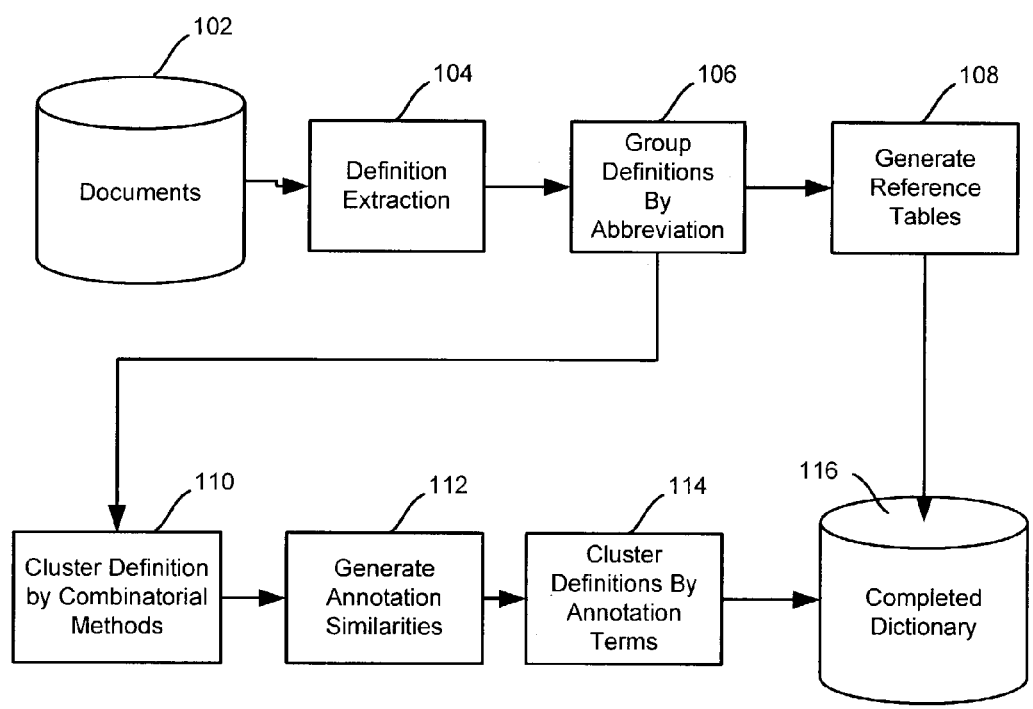
FIG. 1 is a flowchart showing the overall process of building an abbreviation dictionary according with embodiments of the present invention.

Turning now to FIG. 1, a high level flowchart shows some basic steps in building an abbreviation dictionary according to embodiments of the present invention. The data is extracted from a collection of documents 102. These documents 102 may be any sort of textual or binary formatted data, including ACSII text, HTML, XML, Adobe® portable document format (PDF), Microsoft® Word format (DOC), etc. The present invention is applicable for finding abbreviations in such electronic documents as technical journals, web pages, magazine articles, legal databases, patents, etc.

When building an abbreviation dictionary, the abbreviations are identified and associated definitions extracted 104 from the documents 102. These abbreviation-definition pairs will be referred to herein as an "entry" of an abbreviation dictionary. After extraction 104, the entries are then grouped 106 into clusters of entries having identical abbreviations. Therefore, a cluster identified by the "PE" abbreviation may include entries with definitions such as polyethylene, physical education, etc.

The clusters resulting from the initial grouping 106 are useful on their own. In particular, the clusters may be used generate 108 reference tables that can be placed into the completed dictionary 116. These tables may be included as "related definitions" references in the abbreviation dictionary 116. Therefore, once a user finds the definition suggested by the dictionary 116, a "related definitions" table is included that allows the user to manually peruse alternate definitions. A "related abbreviations" table may also be included with entries having different abbreviations but identical or similar definitions. In this way, the user can see related abbreviations for a given definition.

After grouping by abbreviation 106, the entries are further arranged into clusters 110 by known combinatorial and/or statistical methods. In one example, the entries are arranged into clusters 110 by looking at similarities between n-gram sets formed from the entry definitions.

The arrangement of entries into clusters 110 by n-gram analysis will provide an accurate aggregation of like entries for many situations. However, the use of n-grams alone may not resolve all ambiguities in the definition cluster. Generating similarities 112 of the terms based on annotations provides further disambiguation. Annotations refer to descriptive text that provides a context for the definition. Using annotation vectors are one way of generating similarities 112 between annotations.

The annotation vectors can be used to arrange clusters by annotation 114 in a manner similar to n-gram clustering 110. This provides an additional level of disambiguation beside that provided by n-gram clustering 110. After arranging clusters according to annotation similarity 114, the entries can be added to the dictionary 116. The definition clusters arranged by n-gram clustering 110 and annotation similarity 114 can be used in the dictionary to show alternate definitions of a given abbreviation.

Figure 2:
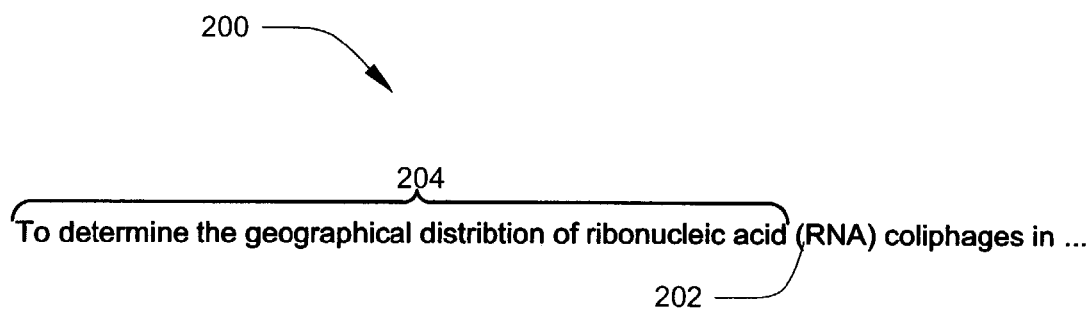
FIG. 2 is a diagram of an example phrase illustrating the extraction of a definition used by an abbreviation dictionary in accordance with embodiments of the present invention.
Figure 3:
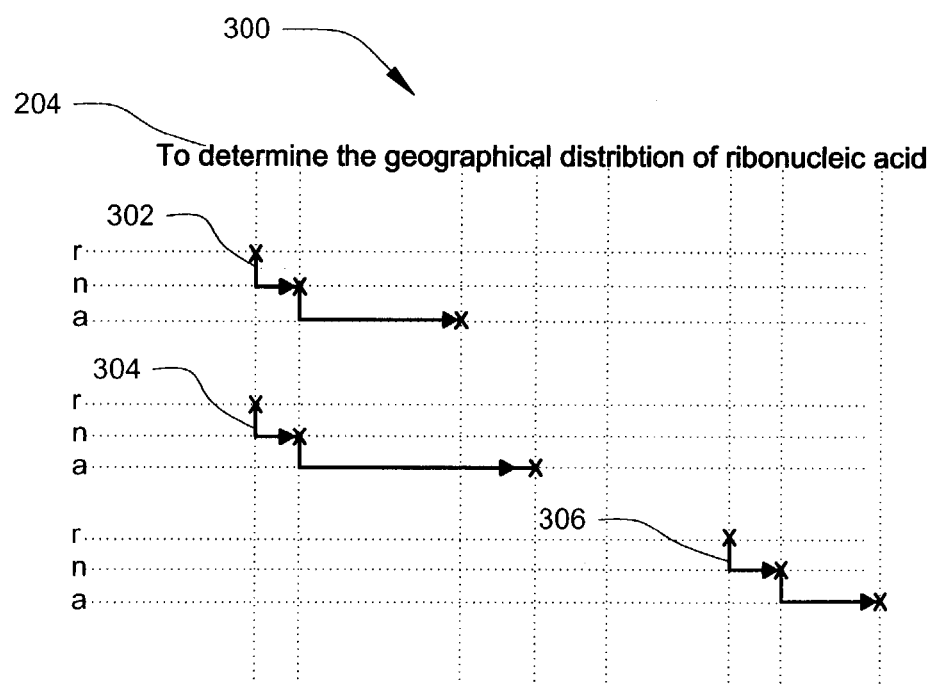
FIG. 3 is a diagram showing various potential definition paths in the example phrase of FIG. 1.

Turning now to the remaining figures, further details are provided of the processes just described. In particular, FIGS. 2 and 3 illustrate an example of extracting definitions 104 as described in relation to FIG. 1. FIG. 2 shows an example sentence 200 containing an abbreviation 202. An abbreviation is usually considered a single word (or hyphenated word) containing at least one capital character, although other characteristics may also be used to identify abbreviations. For example, erroneous words detected by a spell-checker may be abbreviations.

There are many possible ways in which an abbreviation can be defined within a document. The sentence, "Efferent feedback is provided by the release of acetylcholine (ACh) from olivocochlear . . . ", appears to represent the most frequent pattern: <some text> definition (abbreviation) <some text>. However, other arrangements are possible, such as in the sentence, "Efferent feedback is provided by the release of ACh (acetylcholine) from olivocochlear . . . " where the definition, not the abbreviation, is in parentheses.

Other patterns may be used to detect an abbreviation's definition in a document. For example, such as the phrases "stands for" or "is short for" immediately following the abbreviation might indicate a definition was provided. Alternate method of identifying definitions may include simply looking at the sentence where the abbreviation is first used in the document. However, the form where the abbreviation is in parentheses immediately following the definition seems to be the most prevalent. Given enough documents, this form will eventually produce a definition of the abbreviation.

Referring back to FIG. 2, the sentence 200 includes parentheses around the abbreviation 202, and therefore likely contains a definition. After identifying the sentence 200 as potentially containing a definition, a text window 204 is identified that may contain the definition. The window parameters may vary depending on the type of identification. When the window 204 is identified by finding an abbreviation in parentheses, the window 204 generally begins just before the abbreviation 202 and extends towards the beginning of the sentence 200.

An optimized window 204 size can be used to limit the definition search for increased performance and reduction of errors. One method of sizing the window 204 is to select up to n+buffer words prior to the abbreviation, where n is the number of characters in the abbreviation and the buffer is some experimentally derived number. The buffer is used to account for words not in the abbreviation such as articles and prepositions (of, the, a, etc.). A buffer size of 4 has been found to be useful for most texts. Alternate ways of sizing the window 204 include making the window size 2*n.

After the window 204 has been defined, all window text is "normalized" to lower case characters and non-alphanumeric characters are removed. A number of paths through the window are then formed to find potential definition within the window. A path as defined in this context is a set of character locations in the text that align the abbreviation to the potential definition. FIG. 3 shows a graph 300 illustrating example formation of paths in the text window 204 from FIG. 2. Paths 302, 304, and 306 are all possible paths that may define the abbreviation "RNA."

The paths 302, 304, 306 are found by searching forward through the text window and matching characters from the abbreviation in order. This process allows building a path that pinpoints the location of the abbreviation characters within the text. A path can be converted into a definition by taking the span of text starting at the word with the first letter of the abbreviation and ending after the word where the last character of the abbreviation is found.

Path 302 locates the "r" in "determine." The path 302 is extended so that the first "n" is also found in "determine," and the first "a" is in "geographical." This means that the first proposed definition is "determine the geographical." The second path 304 is also found within the phrase "determine the geographical." The final path 306 is generated similarly to 302 and 304, and returns the correct definition, "ribonucleic acid."

Note that none of the paths 302, 304, 306 are formed by searching backwards through the text window 304. There may be some exceptions to the rule of only allowing forward-looking matches. For example, PhD is generally defined as Doctor of Philosophy, a definition that would not be found using a forward-looking process. Reverse paths may be useful if a forward path can not be found.

FIG. 4 shows a pseudo-code implementation of this path building algorithm as well as a number of potential optimizations. The general function of the algorithm is to build a list of possible paths that "explains" the abbreviation A in the window W. A path is a unique collection of ordered indexes placing the abbreviation characters within the window. If the window was "AB CD" and the abbreviation was "AC" one path (in this case the only path) would simply be [0,3].

The first portion 402 of the algorithm in FIG. 4, constructs an index I, holding the indexes of all appearances of each character. This can be optimized to only hold the map for those characters that are actually in the abbreviation. The list of occurrences for character k is then I[4k], and the nth occurrence of character k is accessed by I[k,n]. The next step of the algorithm is to loop over all characters in the abbreviation, gradually building the set of paths through iteration.

The empty path set P is seeded 404 with all the occurrences of the first character. If this set is still empty null is returned. Once the path set is seeded, the path can be extended. The algorithm loops 406 through every path currently in the path set and finds all instances of the next character in the abbreviation. Further enhancements can be added to the algorithm described above to deal with missing characters. In the version described above, if any character is missing so the path cannot be extended, null is returned. This may be undesirable for certain situations and it is here that modifications can be made to support "fuzzy" matching. In one implementation, for example, missing numeric characters may be accepted. For all occurrences of the next character in the text a decision 408 is made whether the index is after the last index in the path.

Instances of the abbreviation character prior to the last index are ignored as they represent an invalid path. If the condition is satisfied, a copy of the path is extended and stored. The loop repeats until all characters are accounted for. In this way the set P always contains valid paths, and the result includes only full paths.

Once the paths are found it is possible to quickly score them to find the most likely definition (or that one doesn't exist). Scoring rules can be chosen that are extremely simple but are nonetheless able to accurately identify the correct abbreviation.

There are many potential scoring rules that could be applied. The following is one example of a set of scoring rules that could be used:

1. For every abbreviation character that is at the start of a definition word, add 1 to the score.
2. For every extra word between the definition and the parenthesis where the abbreviation was found, subtract 1.
3. A bonus point is awarded for definitions that are immediately adjacent to the parenthesis.
4. The number of definition words should be less than or equal to the number abbreviation characters. For every extra word subtract I.

The results of applying these scoring rules to the sample window are shown in FIG. 5. This rule rewarded the highest score 500 to the correct definition 502. As is evident from this small example, the score 500 of the correct definition 502 is higher than the incorrect definitions. The scoring process may be refined so that zero is the break-even for likely definitions. While it is clear from the figure that not all positive scores are correct, negative scores were judged to be highly unlikely.

There are many alternative scoring methods that can be applied. For example, depending on the characteristics of the data, one may check a non-normalized window for capitalizations and attempt to match those to the abbreviation. Alternatively, it may be sufficient to simply look at the first character of the definition instead of every definition word. Other scoring rules can explicitly ignore stop words such as "to" or "of."

Once all paths have been built, each is scored based on the scoring metrics as described above, and the maximum matching path is returned as the most likely definition candidate. Additional optimizations to this algorithm include the scoring of paths as they are being built. Doing this allows discarding of paths early on when it is clear they will not perform better than the current maximum scoring definition.

Once the first step of extracting likely definitions has been completed, it is necessary to group definitions that are related into clusters. Related definitions are frequently simple plurals of the basic abbreviation. For example, "Estrogen Receptor" and "Estrogen Receptors" are both valid definitions for ER (there are actually at least 86 such unique definitions). However, there are certain situations where definitions containing different words represent the same concept. An example of this is the abbreviation EREs that is defined as both Estrogen Response Elements and Estrogen Responsive Elements.

In order to reduce all definitions having the related word stems, the description of the present invention presents two example clustering techniques. The first, an n-gram based, approach attempts to find definitions with related stems. The second utilizes annotations to further cluster definitions.

An n-gram based approach is useful due to its versatility in comparing words stems. It is clear for a human seeing a set of definitions such as Computer Tomography, Computed Tomographs, Computerised Tomographic, and Computetomographic (some of the many definitions of CT) that they are all related. An n-gram based algorithm is easy to implement and does not require any training to make the same determination.

Figure 6:
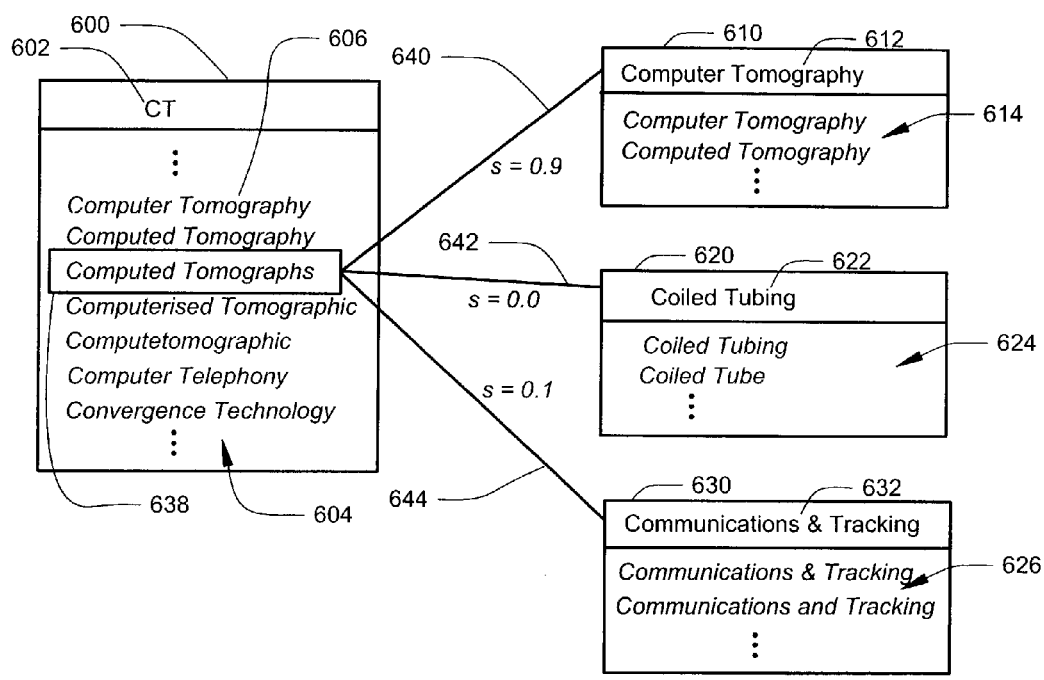
FIG. 6 is a diagram representing the clustering of dictionary entries having multiple definitions that may be represented in accordance with embodiments of the present invention.

When applying an n-gram clustering to the definition, the entries having identical abbreviations but different definitions must first be grouped together. FIG. 6 represents the clustering of dictionary entries having multiple definitions.

The group 600 for the abbreviation "CT" 602 has multiple definitions 604 ("Computer Tomography", "Computed Tomography", etc.). Assuming "Computer Tomography" 606 is the most popular definition (i.e. the definition having the most identical entries), it is used as the primary definition 612 of the first cluster 610. Placed in the cluster 610 are entries 614 that are similar to the primary definition 612. Other clusters 620 and 630 have primary definitions "Coiled Tubing" 622 and "Communications & Tracking" 632, respectively. The clusters 620, 630 also have entries, 624, 626 as shown in the lower half of the boxes.

When evaluating the definitions 604 for placement into a cluster, each definition is broken into a set of n-grams. In common choice of n-grams in this type of applications are tri-grams. For example, the term "computer" contains the set of tri-grams (com, omp, mpu, put, ute, ter). By comparing this set of tri-grams to another term such as "computing" which as the tri-gram set (corn, omp, mpu, put, uti, tin, ing), a similarity value can be calculated by analyzing the intersection of the sets. In one example, calculation of the similarity between the terms is expressed by:

$$\text{similarity}_{NGRAM}(D_1, D_2) = \frac{\|D_1 \cap D_2\|}{\sqrt{\|D_1\|} * \sqrt{\|D_2\|}} \quad 1)$$

The numerator represents the number of intersecting trigrams between the definition D1 and definition D2. The denominator is a normalization factor based on the number of tri-grams in both definitions.

An alternative to the n-gram similarity metric is a strategy such as using Basic Local Alignment Search Tool (BLAST) to determine similarity of text. BLAST uses an algorithm that seeks out local alignment (the alignment of some portion of two sequences) as opposed to global alignment (the alignment of two sequences over their entire length). By searching for local alignments, BLAST is able to identify regions of similarity within two sequences.

In the example of FIG. 6, three (simulated) similarity values 640, 642, and 644 are calculated between the term "Computed Tomographs" 638 and the primary definitions 612, 622, 632, respectively. The similarity value 640 is greatest for the primary definition "Computer Tomography" 612. Assuming the similarity value 640 is above some predefined threshold, the definition "Computed Tomographs" 638 would be placed in the cluster 610. This sequence continues until all definitions in the group 600 have been placed in a cluster.

Figure 7:
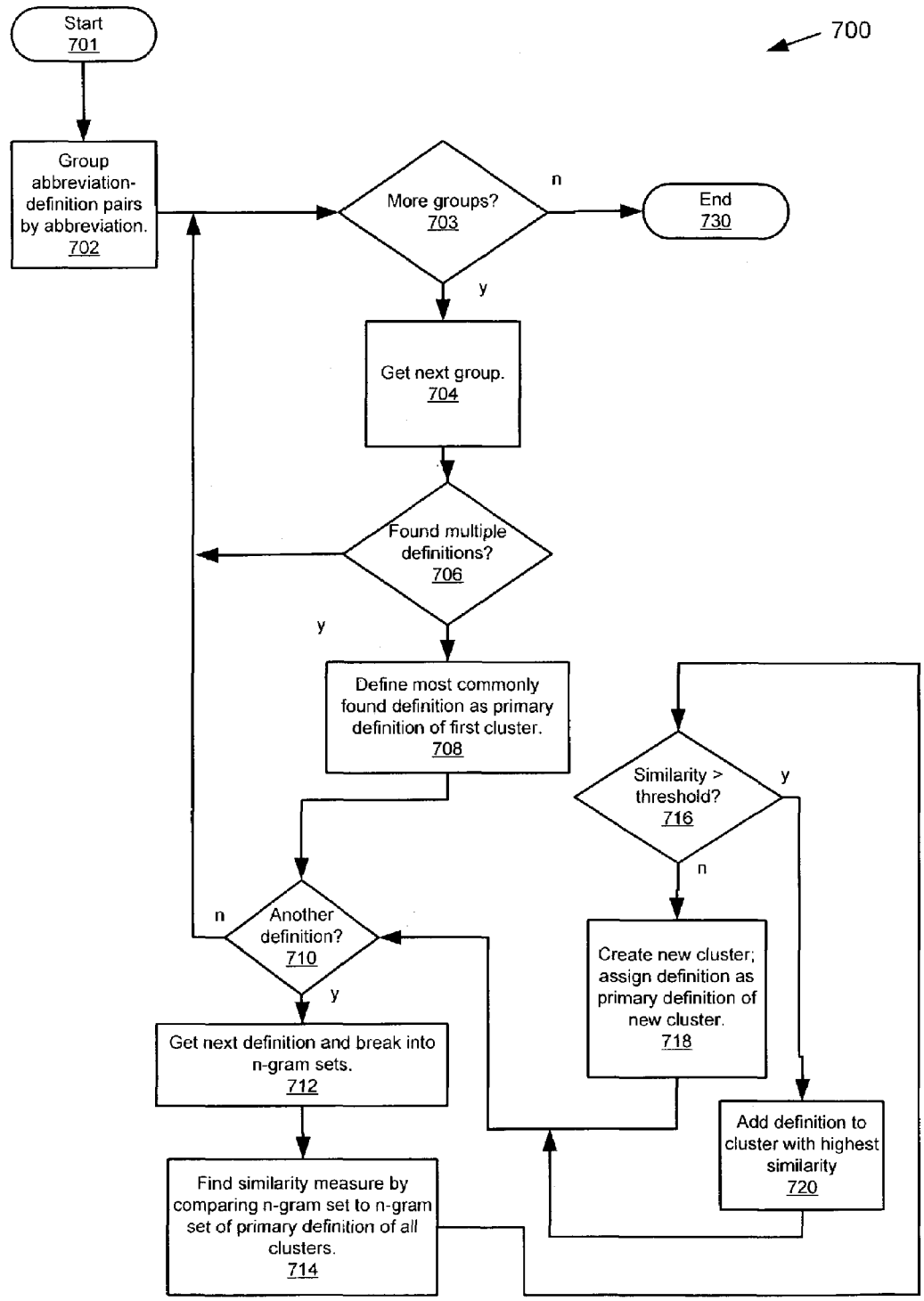
FIG. 7 is a flowchart describing a routine for n-gram clustering in accordance with embodiments of the present invention.

FIG. 7 is a flowchart of an example routine 700 for performing n-gram clustering. At the start 701, the extracted dictionary entries are grouped 702 so that entries in each group have the same abbreviation. The existence of the next group is checked 703, and if available the next group is selected 704. The group is sorted and checked 706 for multiple entries. Assuming the group contains multiple entries, a primary definition of the first cluster is defined 708. Defining the first cluster's primary definition 708 in this example involves finding the highest occurrence of identical entries, that is entries with the same abbreviation and definition. In the event of ties or no identical entries, any entry may be used to define the primary definition 708.

Next, the existence of the next definition is checked 710, and if it exists, the definition is extracted and broken into n-gram sets 712. A similarity value is calculated 714 by comparing the n-gram set to an n-gram set of the primary definition of all the clusters. The similarity values are compared 716 to a threshold value. In one application, a threshold value of 0.6 was used. If none of the similarity values are above the threshold, then a new cluster is created 718 with this definition as the primary definition.

If one or more of the similarity values are above the threshold, then the definition is added 720 to the cluster with the highest similarity value. The routine ends 730 when no more definitions or groups are found 710, 703. The output of this routine 700 is a set of clusters, each having an abbreviation, a primary definition and zero or more associated definitions that are n-gram similar.

It is appreciated that various modifications can be applied to the routine 700. For example, grouping by abbreviation 702 may output only those groups having multiple, non-identical entries. Therefore checking for multiple definitions 706 would be unnecessary, as well as avoiding steps 708–720 for groups having all identical entries.

After completing the initial n-gram clustering, it is often the case that certain related definitions are placed in separate clusters. This is likely the result of borderline scores that do not exceed the defined threshold. However, lowering the threshold score may result in too many false clusters. Instead, annotations or document text can be used on the data set to augment the initial results.

As used herein, the term "annotations" generally refers to an arrangement of data where terms of art and interpretations of those terms are stored for access. Annotations may provide an indexing or linkage between various terms so that data can be accessed and analyzed according to some sort of interrelationship. Various annotations are known in the art, including titles and abstracts of documents, indexed guides to periodicals, citation and journal indices, classification systems such as KeyCite® digests for legal research, etc. The document text itself can be considered an annotation, since the document often contains useful terms defining the context of the extracted definitions.

One example of annotations that will be used in describing aspects of the present invention is the Medical Subject Headings (MeSH®) database. MeSH is the National Library of Medicine's controlled vocabulary thesaurus. MeSH includes sets of terms naming descriptors in a hierarchical structure that permits searching at various levels of specificity. The hierarchical categories have headings that describe the entries contained within the heading. For example, a heading such as "Coronary Stenosis" may be arranged under a subheading "Coronary Disease" which is itself under a subheading of "Heart Diseases." MeSH also includes a large number of cross-references that assist in finding the most appropriate MeSH heading. For example, "Vitamin C see Ascorbic Acid." While these features are described as specific to MEDLINE, annotations may be used in similar ways in other document collections.

To perform MeSH based clustering, it is necessary to generate a representation of the MeSH concepts representing each initial cluster. This process includes taking each cluster, finding the initial documents from which the definitions were extracted, extracting the MeSH headings from those documents, and finally generating a vector representing the MeSH terms. For vector generation, a standard Information Retrieval technique known as Term Frequency, Inverse Document Frequency (TFIDF) can be used to compare each cluster. Each dimension (each MeSH term is represented by a dimension) in the vector is calculated by:

$$w_i = \frac{freq_i}{freq_{max}} * \log\frac{N}{n_i} \qquad 2)$$

where the weight for the MeSH term i is calculated by the frequency of that term in the cluster normalized by the count of the most frequently occurring term. This is multiplied by $\log(N/n_i)$ where N is the total number of documents and $n_i$ is the number of documents in which the term i appears. For this step, N is actually the number of documents mentioning the abbreviation we want clustered and $n_i$ is a subset of that group. This reduces the weight of MeSH terms that frequently occur in all documents and therefore do not hold much information.

The similarity metric that is applied is based on the angle between two vectors (representing two unique definition clusters). Specifically:

$$\text{similarity}_{\cos}(\vec{D}_1, \vec{D}_2) = \frac{\sum D_{1,i} * D_{2,i}}{\|\vec{D}_1\| * \|\vec{D}_2\|} \qquad 3)$$

The same algorithm used in the n-gram clustering is applied here utilizing the new cluster representations and new similarity metric (and a threshold of 0.3). MeSH based clustering is particularly useful for finding nested abbreviations. For example, RGH is defined as both Rat GH and Rat Growth Hormone. Because of the threshold of the n-gram clustering, definition folds of this type were missed.

An alternative to consider where MeSH or other equivalent annotations are not available is to simply use the text in the titles, abstracts, and/or body of the articles to generate term vectors that can be compared using the similarity metric above. Further, alternate similarity metrics such as Euclidean, city-street, Dice, Jaccard, etc., can be used instead of the vector generation method to perform annotation based clustering.

Figure 8:
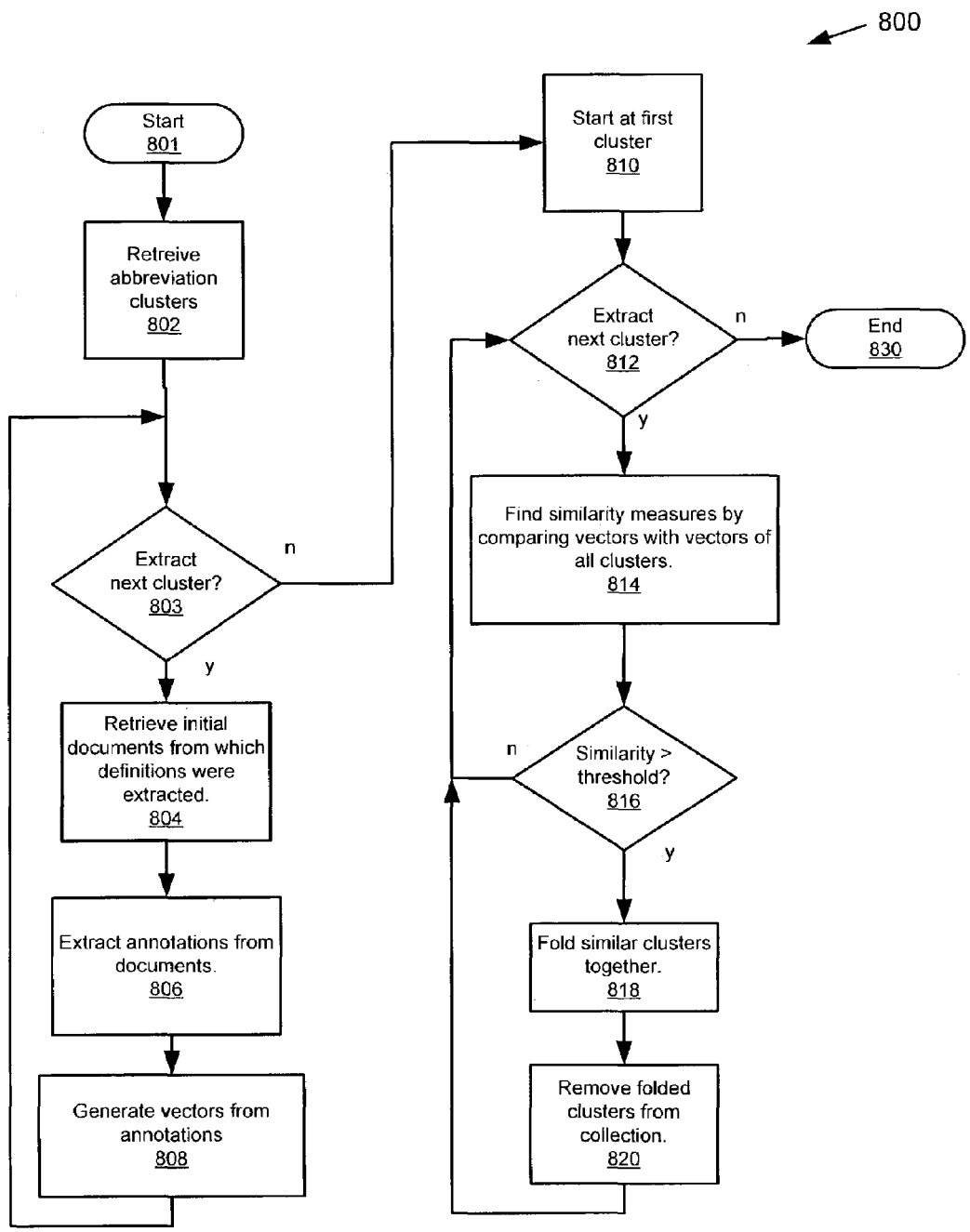
FIG. 8 is a flowchart describing a routine for annotation vector clustering in accordance with embodiments of the present invention.

FIG. 8 is a flowchart of an example routine 800 for performing annotation based clustering. At the start 801, the abbreviation clusters are retrieved 802 and each cluster is extracted 803. The abbreviation clusters may be passed in to routine 800 as an output of the n-gram clustering routine 700 or otherwise retrieved 802 by the routine 800.

Assuming another cluster is available for extraction 803, the initial documents from which the cluster definitions are identified and retrieved 804. The annotations are then extracted 806 from these documents. If the documents are MEDLINE documents, then the annotations extracted 806 are the MeSH headings. The extracted annotations are used to generate annotation vectors 808.

After no more clusters are available for extraction 803, the collection is again reexamined by starting 810 at the first cluster. Each cluster is extracted 812 and the cluster's annotation vectors are compared with the vectors of the remaining clusters to obtain similarity measures 814. If any of the similarity measures exceed a threshold 816, then those clusters having the similarity measures above the threshold are folded together 818. Any folded clusters should be removed from the collection 820 to prevent repetitious folding of clusters. This proceeds until all clusters have been extracted 812 and examined, after which the routine ends 830.

Again, the routines 700, 800 are only an examples used for explanation of the present invention. It will be readily apparent to one skilled in the art that various alternative sequences, steps, error checking, and optimization may be applied to the illustrated routines 700, 800 while still falling within the scope of the present invention.

After constructing an initial dictionary, one of the most challenging problems remaining is classifying new abbreviations when no definition can be extracted from the text. Users may also wish to have abbreviation results clustered or filtered quickly based on the context of various definition senses. To accomplish this, the annotation vectors generated for clustering can be reused to correctly classify new abbreviations into the appropriate definition cluster. A new document can then be compared to previous annotation vectors and bucketed correctly.

Figure 9:
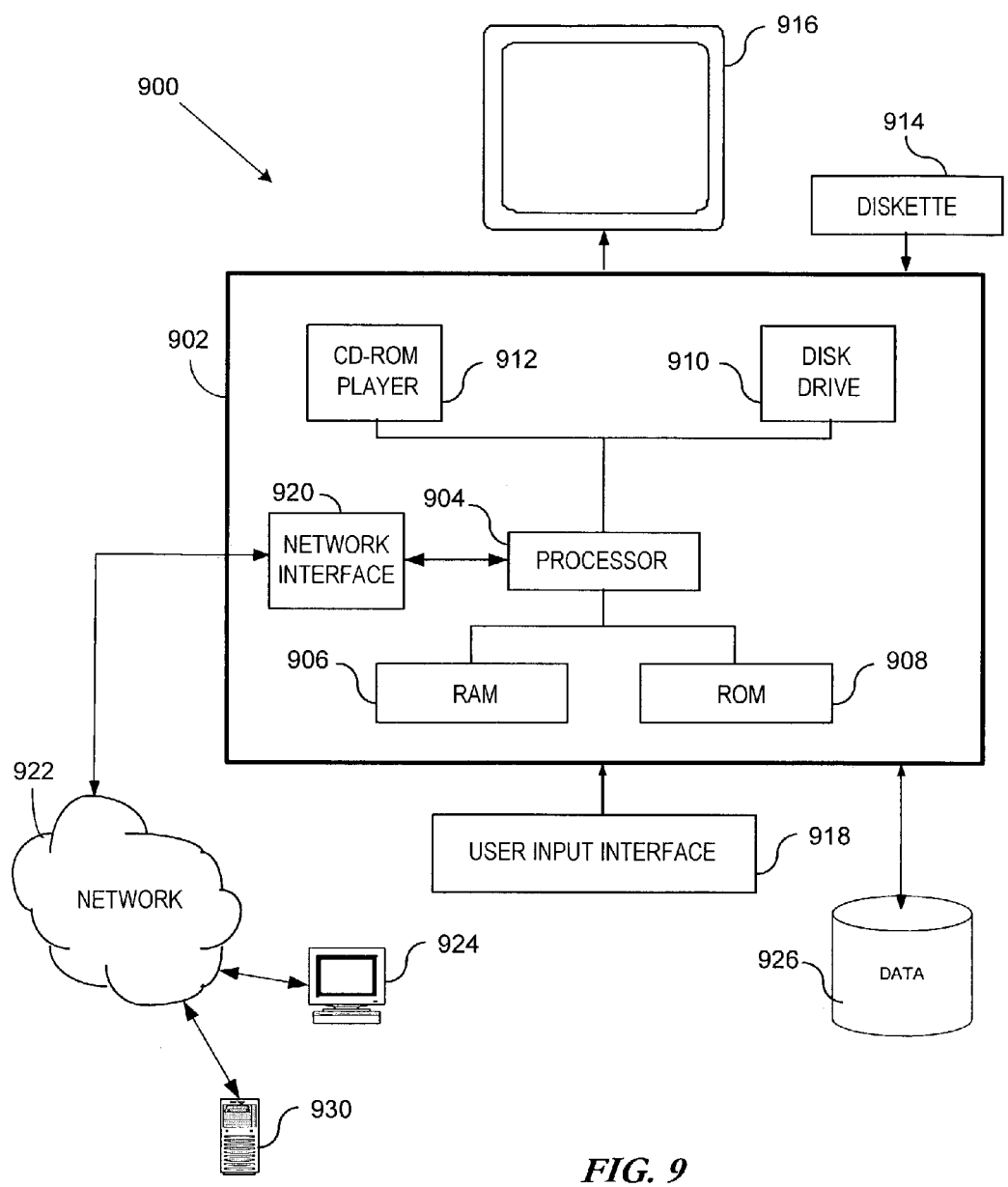
FIG. 9 is a diagram of an abbreviation dictionary system in accordance with embodiments of the present invention.

FIG. 9 shows a system 900 utilizing concepts of the present invention. The system includes a computing apparatus 902 with a processor 904 and coupled to some form of data storage. The data storage may include volatile memory such as RAM 906. Other devices that the apparatus 902 may use for data storage and retrieval include a ROM 908, disk drive 910, CD-ROM 912, and diskette 914. A display 916 and user input interface 918 are attached to the computing apparatus 902 to allow data input and display. The computing apparatus 902 includes a network interface 920 that allows the apparatus to communicate with other computing devices 924 across a network 922.

In one embodiment of the invention, the computing apparatus 902 builds an abbreviation dictionary as previously described from documents stored on some sort of memory 908, 910 or over the network 922. The abbreviation dictionary may be shown on the display 912, stored to persistent storage 910, 912, 914, or published over the network 922.

In one arrangement, the abbreviation dictionary is regularly updated and served to other computing devices over the network using the hyper-text transport protocol (HTTP) on a web site. The HTTP server can run on the computing apparatus 902 or on another server 930. Users accessing the web server 930 will see the dictionary presented as a series of web pages.

Presenting the dictionary with a web page interface gives users access to the various annotations generated by the dictionary building modules. FIGS. 10–13 illustrate various screens from an example interface. Users are able to search for both abbreviations and definitions. For example, FIG. 10 shows a resulting interface 1000 produced in a search for abbreviations beginning with "AA". Next to each match 1002, the most common definition is shown 1004. Clicking on the "more" 1006 link opens up a summary screen as seen in FIG. 11.

The web page 1100 in FIG. 1100 initially displays all the main definitions of each cluster for the abbreviation "AA." Clicking on each of these bars (as was done for arachiodonic acid 1102) causes the interface to dynamically expand the screen to include other definition features 1104. Related definitions 1106 are those folded by the n-gram clustering technique. The definitions 1106 may be represented with different colors to represent how similar (based on the similarity metric) they are to the main definition. For example, arachiodonic is considered more similar to arachiodonic acid then is arachiodate acid (although both are very similar), therefore color coded text and/or backgrounds could be used to indicate this difference.

The possible filters 1108 are the various concepts that are unique to a particular definition. For the MEDLINE data set, these are simply the MeSH terms that were produced by vector definition in the MeSH clustering technique. A user wishing to find only documents mentioning an abbreviation within a given context may make use of these filter terms to narrow down the MEDLINE search. Definitions with cross-links will display these links under a "see also" heading 1110. The user can easily navigate between summary screens in order to find alternate abbreviations associated with the definitions.

As shown in FIG. 11, those definitions that were determined to be relevant by the MeSH clustering are listed underneath the main definition with a slight indentation. For example, ascorbate 1112 is displayed in this way under ascorbic acid 1114.

Finally, FIG. 12 illustrates a sample application built on the disambiguation capabilities of a system according to the present invention. Users are able to issue queries against the MEDLINE (in the standard PubMed syntax). They are also able to determine which abbreviation should be used to cluster the results. In FIG. 12, the user has issued a query for documents containing DCC and mice, and would like the results clustered into the various meanings of DCC. Documents such as 1202 are placed under the definitions 1204 to which they relate, either through exact matches, n-gram similarity, or MeSH similarity. In this way users can quickly narrow down their results to a specific definition. A legend 1206 is used to identify how the document 1202 relates to the definition. The legend 1206 can display a color indicator (text color, background color, border color, etc) for each relation (exact matches, n-gram similarity, or MeSH similarity) and the document 1202 would be shown with a color indication to indicate this relation.

From the description provided herein, those skilled in the art are readily able to combine hardware and/or software created as described with appropriate general purpose or system and/or computer subcomponents embodying the invention, and to create a system and/or computer subcomponents for carrying out the method of the invention. The concepts of the present invention can be implemented in any combination of hardware and software.

The foregoing description of the example embodiments of the invention have been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer-implemented method for building an abbreviation dictionary, comprising:
   extracting a plurality of entries from a plurality of source documents, each entry including an abbreviation and a definition;
   grouping the entries into definition sets, the entries in each definition set having identical abbreviations;
   calculating similarity values between pairs of the definitions of the entries within each definition set and aggregating each pair of entries having a similarity value that satisfies a selected threshold value into a definition cluster within each definition set; and
   wherein calculating the similarity values between the definitions comprises forming an n-gram set for each definition and calculating the similarity values as a function of the n-gram sets of the definitions.

2. The method of claim 1, wherein calculating the similarity value between the definitions further comprises:
   determining an intersection of the n-gram sets of the definitions; and
   calculating the similarity value by dividing the intersection by a normalization factor based on the total number of n-grams in the n-gram sets of the definitions.

3. The method of claim 1, wherein the n-gram sets of the definitions comprise tri-gram sets.

4. The method of claim 1, further comprising aggregating the definition clusters based on a similarity between annotations related to the source text from which each definition was extracted.

5. The method of claim 4, wherein aggregating the definition clusters further comprises:
   generating a plurality of vectors of annotations for each of the definitions; and
   aggregating the definition clusters based on angles between the plurality of vectors.

6. The method of claim 1, wherein forming the plurality of definition clusters further comprises:
   associating a primary definition with each of the definition clusters;
   for each definition, performing steps (a)–(d):
   (a) calculating the similarity values between the definitions and the primary definitions of the definition clusters;
   (b) selecting a highest similarity value of the similarity values, the highest similarity value associated with the primary definition of one of the definition clusters;
   (c) placing the definition in the definition cluster associated with the highest similarity value if the highest similarity value is greater than the threshold value; and
   (d) associating the definition as the primary definition of a new definition cluster if the highest similarity value is not greater than the threshold value.

7. The method of claim 1, wherein calculating the similarity values between each of the definitions comprises calculating the similarity value as a function of annotations related to the source text from which each definition was extracted.

8. The method of claim 7, wherein calculating the similarity values further comprises:
   generating a plurality of vectors of annotations for each of the definitions; and
   calculating the similarity values as angles between the plurality of vectors.

9. The method of claim 1, wherein extracting the plurality of entries from the plurality of source documents comprises:
   searching for an abbreviation in the source documents;
   defining a text window proximate the abbreviation that defines a potential definition of the abbreviation;
   generating one or more paths through the text window;
   assigning a score to each of the one or more paths based on a scoring rule; and
   selecting the path with the highest score as a definition of the abbreviation.

10. The method of claim 1, further comprising creating a cross link between the entries and related entries having different abbreviations.

11. The method of claim 10, wherein related entries comprise entries having similarity values therebetween greater than a predetermined similarity value.

12. The method of claim 1, further comprising presenting the definition clusters as a set of alternate definitions for the entries.

13. An article of manufacture for building an abbreviation dictionary, comprising:

a computer-readable medium configured with instructions for causing a computer to perform the steps of:
   extracting a plurality of entries from a plurality of source documents, each entry including an abbreviation and a definition;
   grouping the entries into definition sets, the entries in each definition set having identical abbreviations;
   calculating similarity values between pairs of the definitions of the entries within each definition set and aggregating each pair of entries having a similarity value that satisfies a selected threshold value into a definition cluster within each definition set; and
   wherein calculating the similarity values between the definitions comprises forming an n-gram set for each definition and calculating the similarity values as a function of the n-gram sets of the definitions.

14. The article of manufacture of claim 13, wherein calculating the similarity value between the definitions further comprises:
   determining an intersection of the n-gram sets of the definitions, and
   calculating the similarity value by dividing the intersection by a normalization factor based on the total number of n-grams in the n-gram sets of the definitions.

15. The article of manufacture of claim 13, wherein the n-gram sets of the definitions comprise tri-gram sets.

16. The article of manufacture of claim 13, further comprising aggregating the definition clusters based on a similarity between annotations related to the source text from which each definition was extracted.

17. The article of manufacture of claim 16, wherein aggregating the definition clusters further comprises:
   generating a plurality of vectors of annotations for each of the definitions; and
   aggregating the definition clusters based on angles between the plurality of vectors.

18. The article of manufacture of claim 13, wherein forming the plurality of definition clusters further comprises:
   associating a primary definition with each of the definition clusters;
   for each definition, performing steps (a)–(d):
   (a) calculating the similarity values between the definitions and the primary definitions of the definition clusters;
   (b) selecting a highest similarity value of the similarity values, the highest similarity value associated with the primary definition of one of the definition clusters;
   (c) placing the definition in the definition cluster associated with the highest similarity value if the highest similarity value is greater than the threshold value; and
   (d) associating the definition as the primary definition of a new definition cluster if the highest similarity value is not greater than the threshold value.

19. The article of manufacture of claim 13, wherein calculating the similarity values between each of the definitions comprises calculating the similarity value as a function of annotations related to the source text from which each definition was extracted.

20. The article of manufacture of claim 19, wherein calculating the similarity values further comprises:
   generating a plurality of vectors of annotations for each of the definitions; and
   calculating the similarity values as angles between the plurality of vectors.

21. The article of manufacture of claim 13, wherein extracting the plurality of entries from the plurality of source documents comprises:
   searching for an abbreviation in the source documents;
   defining a text window proximate the abbreviation that defines a potential definition of the abbreviation;
   generating one or more paths through the text window;
   assigning a score to each of the one or more paths based on a scoring rule; and
   selecting the path with the highest score as a definition of the abbreviation.

22. The article of manufacture of claim 13, further comprising creating a cross link between the entries and related entries having different abbreviations.

23. The article of manufacture of claim 22, wherein related entries comprise entries having similarity values therebetween greater than a predetermined similarity value.

24. The article of manufacture of claim 13, further comprising presenting the definition clusters as a set of alternate definitions for the entries.

25. An apparatus for building an abbreviation dictionary, comprising:
   means for extracting a plurality of entries from a plurality of source documents, each entry including an abbreviation and a definition;
   means for grouping the entries into definition sets, the entries in each definition set having identical abbreviations;
   means for calculating similarity values between the definitions of the entries within each definition set and for aggregating entries having a similarity value that satisfies a selected threshold value into a definition cluster within each definition set; and
   wherein the means for calculating the similarity values between the definitions comprises means forming an n-qram set for each definition and calculating the similarity values as a function of the n-gram sets of the definitions.

26. The apparatus of claim 25, further comprising means for aggregating the definition clusters based on a similarity between annotations related to the source text from which each definition was extracted.

27. The apparatus of claim 25, further comprising means for creating a cross link between the entries and related entries having different abbreviations.

28. The apparatus of claim 25, further comprising means for presenting the definition clusters as a set of alternate definitions for the entries.

* * * * *

UNITED STATES PATENT AND TRADEMARK OFFICE
CERTIFICATE OF CORRECTION

PATENT NO. : 7,136,876 B1
APPLICATION NO. : 10/379003
DATED : November 14, 2006
INVENTOR(S) : Eytan Adar et al.

It is certified that error appears in the above-identified patent and that said Letters Patent is hereby corrected as shown below:

In column 5, line 40, delete "I[4k]" and insert -- I[k] --, therefor.

In column 6, line 15, delete "I" and insert -- 1 --, therefor.

In column 7, line 18, delete "corn" and insert -- com --, therefor.

In column 13, line 21, in Claim 14, after "definitions" delete "," and insert -- ; --, therefor.

In column 14, line 44, in Claim 25, delete "n-qram" and insert -- n-gram --, therefor.

Signed and Sealed this

First Day of December, 2009

David J. Kappos
*Director of the United States Patent and Trademark Office*